Patented Feb. 26, 1924.

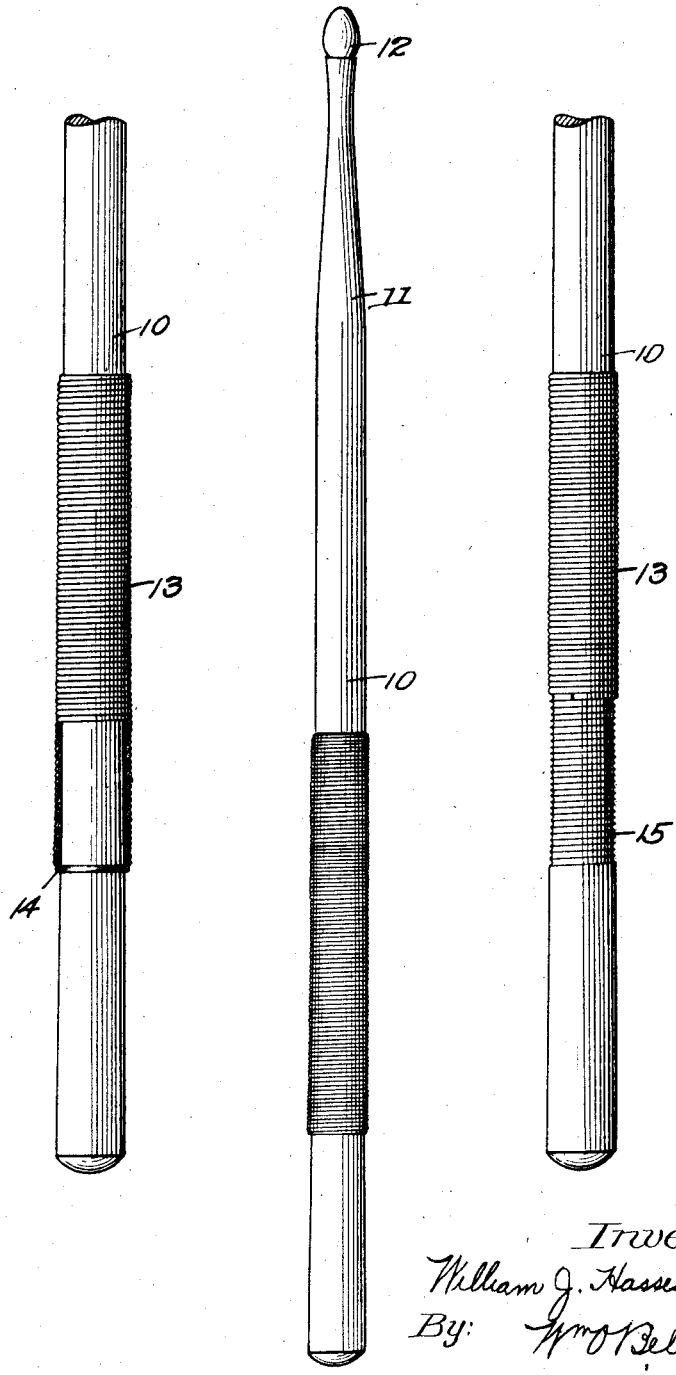

1,484,777

UNITED STATES PATENT OFFICE.

WILLIAM J. HASSENPFLUG, OF CHICAGO, ILLINOIS.

DRUMSTICK.

Application filed January 12, 1922. Serial No. 528,600.

*To all whom it may concern:*

Be it known that I, WILLIAM J. HASSENPFLUG, a citizen of the United States, residing at Chicago, in the county of Cook and State of Illinois, have invented certain new and useful Improvements in Drumsticks, of which the following is a specification.

This invention relates to musical instruments and particularly to the sticks used in playing drums, xylophones, etc. These sticks must be grasped lightly near the balance between the thumb and forefinger, or between the thumb, forefinger and middle finger, so as to permit them to bound freely by somewhat pivotal movement, under the control of other fingers, or other portions of the hand. This point of grasp cannot be much varied without destroying the control of the stick; and, during parades and other outdoor performances, musicians find difficulty in maintaining the proper hold on the sticks due to perspiration in hot weather and that peculiar slippery condition produced by cold, in winter. The difficulty is more serious in winter because the use of gloves reduces the security of the hold on the stick, and musicians suffer considerably from exposing their bare hands to the low temperature.

The object of this invention is to provide a stick that can be easily retained in either the bare or the gloved hand with the light grasp necessary to its use, regardless of the temperature.

In the accompanying drawing I have shown selected embodiments of the invention which will serve to illustrate its use and application.

Fig. 1 is an elevation of the preferred form of the invention;

Fig. 2 is an enlarged detail of the preferred form; and

Fig. 3 is an enlarged detail of a modified form.

These sticks 10 are generally made of hard wood possessing a high degree of resilience and are tapered or waist-shaped at 11 toward the striking end which terminates usually in a bulb 12 presenting a rounded point for contact with the drum. This tapering makes the striking or the pointed end more yielding and springy, shifts the balance toward the opposite end and gives the stick more life. In use, the point of grasp becomes a practically neutral center about which the ends rotate and from which they vibrate in striking and rebounding from the instrument, the amplitude of the vibrations being greater, of course, as the distance from this point increases and varying with the liveliness of the stick. The vibrations of the butt are sympathetic only and do not materially affect the life of the stick, which depends mainly upon the form and condition of a stick between the point of grasp and bulb or striking point. By taking advantage of these conditions and wrapping a stick from a point slightly in front of the balance to a point a greater distance to the rear of the balance, I have found that a grip surface of sufficient area to afford proper hold under all conditions of weather can be obtained without impairing the performance of the stick in use. As illustrated in Figs. 1 and 2, the wrapping of cord, twine or the like 13 is wound tightly onto the stick so as to make it bite in and seat itself against movement lengthwise to the stick. The ends of the wrapping may be secured by making a slight groove 14 for the first and last turns of the wrapping and inserting the ends backward under the adjacent turns. These grooves will prevent the end turns from being moved, and they will serve to prevent any movement of the other turns that might otherwise take place. I wish it understood, however, that grooving is not an essential of the invention, as the wrapping may be secured without it, and the full benefits of the invention obtained.

In Fig. 3, I have shown the stick provided with a shallow helical groove 15 corresponding in size and pitch to the winding, made necessary by the diameter of the cord used. I prefer, however, not to alter the surface of the stick more than to provide a slight groove for the ends, so as to protect them in service.

The length of the winding will, of course, depend upon particular conditions, but it should not be longer than is necessary to provide the contact surface for the average hand in the position customarily assumed by musicians. With properly selected wrapping extending only a short distance from the balance towards the point, the performance of the stick is not materially modified, but sufficient grip surface can be provided to afford proper control of the stick. I prefer to use a light cord so as to not alter the weight of the stick materially, and I prefer not to extend the wrapping any further toward the butt than is necessary to give the desired gripping surface.

By proper selection of colors in wrapping, the improved sticks may be made very attractive and may be made appropriate to the particular occasion.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. As a new article of manufacture, a drum stick having a butt, a point, a balance between the butt and the point where the stick should be held for proper execution, and a cord winding on the balance of the stick and terminating at or about the ends thereof.

2. As a new article of manufacture, a drum stick having a butt, a point, a balance between the butt and the point where the stick should be held for proper execution, said stick having grooves at or adjacent the ends of the balance part of the stick, and a cord winding extending throughout the balance of the stick and having its end turns seated in said grooves.

WILLIAM J. HASSENPFLUG.